United States Patent
Ueda

(10) Patent No.: US 7,728,887 B2
(45) Date of Patent: Jun. 1, 2010

(54) IMAGE PROCESSING DEVICE AND METHOD

(75) Inventor: Toru Ueda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

(21) Appl. No.: 11/819,471

(22) Filed: Jun. 27, 2007

(65) Prior Publication Data

US 2008/0002037 A1    Jan. 3, 2008

(30) Foreign Application Priority Data

Jun. 28, 2006    (JP) .............................. 2006-178270

(51) Int. Cl.
    *H04N 9/64* (2006.01)
(52) U.S. Cl. ................. 348/248; 348/223.1; 348/222.1; 348/315; 382/300
(58) Field of Classification Search ....................... None
    See application file for complete search history.

(56) References Cited

U.S. PATENT DOCUMENTS

2006/0092485 A1* 5/2006 Tamaru ....................... 358/518
2006/0098868 A1* 5/2006 Fainstain et al. ............ 382/167
2007/0040916 A1* 2/2007 Ashida et al. ............ 348/222.1

FOREIGN PATENT DOCUMENTS

| JP | 2004-172859 A | 6/2004 |
| JP | 2004-295709 A | 10/2004 |

* cited by examiner

*Primary Examiner*—David L Ometz
*Assistant Examiner*—Angel L Garces-Rivera
(74) *Attorney, Agent, or Firm*—Birch, Stewart, Kolasch & Birch, LLP

(57) ABSTRACT

Image data of a digital signal is inputted to a digital signal processor. A CPU reads out color correction coefficients from a ROM. Weights are added to the color correction coefficients based on information regarding transfer efficiency of a CCD image sensor such that the coefficients in a horizontal direction are set larger than those in a vertical direction. Further, an interpolation processor calculates horizontal and vertical components of R, G, and B colors of each pixel through color interpolation processing based on image data of each pixel and its peripheral pixels. A linear matrix circuit is controlled by the CPU and subjects the horizontal and vertical components to linear matrix operation using the color correction coefficients, thus subjecting each pixel data to color correction processing.

10 Claims, 6 Drawing Sheets

DIRECTION IN WHICH LEAKAGE OCCURS
(HORIZONTAL DIRECTION)

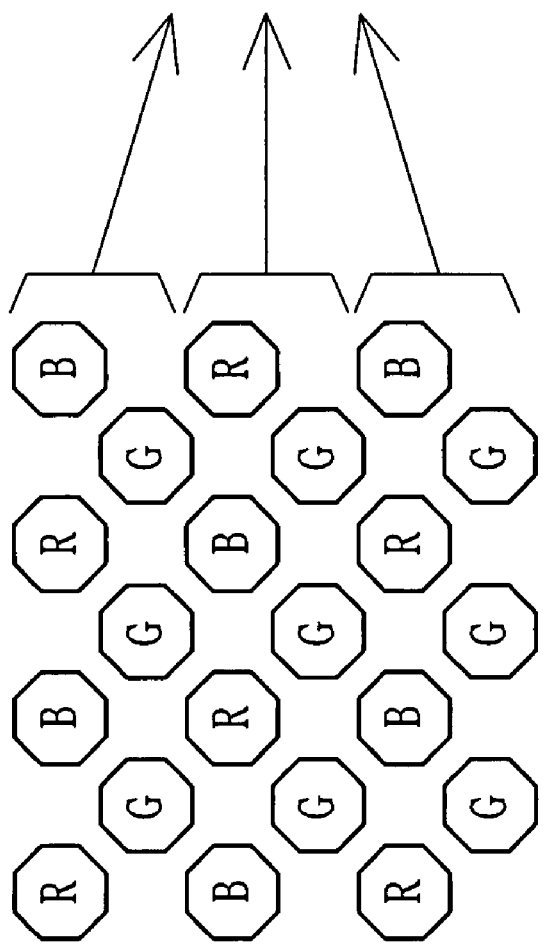

DIRECTION IN WHICH LEAKAGE OCCURS
(HORIZONTAL DIRECTION)

DIRECTION IN WHICH LEAKAGE OCCURS
(HORIZONTAL DIRECTION)

DIRECTION IN WHICH LEAKGE OCCURS
(HORIZONTAL DIRECTION)

IMAGE PROCESSING DEVICE AND METHOD

FIELD OF THE INVENTION

The present invention relates to an image processing device for subjecting image data captured by a CCD image sensor to linear matrix processing so as to correct the color of the image, and an image processing method therefor.

BACKGROUND OF THE INVENTION

Recently, there is known a digital camera, which is provided with a CCD image censor and subjects image data captured by the CCD image sensor to various kinds of image processing to record the image data on a recording medium such as a memory card. Such a digital camera has a problem in that, due to the deterioration of transfer efficiency of the CCD image sensor, leak of charges occur between the pixels adjacent to each other at the time of being transferred, to cause color phase shift, and therefore the quality of captured image is deteriorated.

Further, in order to solve the problem described above, there is known an invention as follows. Before image data obtained by capturing a subject by use of a time delay integration (TDI) type image sensor including a plurality of one-dimensional image sensors arranged in a direction perpendicular to a longitudinal direction of the TDI type image sensor is subjected to image processing, the total amount of charges remained not being transferred vertically of each image sensor is preliminarily obtained based on the vertical transfer efficiency of the TDI image sensor, and the total amount of charges remained not being transferred vertically is subtracted from the image data captured by the TDI image sensor, thus subjecting the image data to image processing (see Japanese Patent Application Laid-open No. 2004-295709, for example).

Additionally, there is known an invention in which an electronic shutter pulse corresponding to a signal with a different storage time is applied as a driving voltage to read electrodes capable of being independently driven, to enhance the electric charge amount processed by a V resistor and to improve the transfer efficiency (see Japanese Patent Application Laid-open No. 2004-172859, for example).

However, according to the inventions disclosed in Japanese Patent Applications Laid-open Nos. 2004-295709 and 2004-172859, it is necessary to preliminarily obtain the total amount of charges remained not being transferred vertically of each image sensor and subtract the total amount of charges remained not being transferred vertically from the image data. Therefore, there is a problem in that the processing speed is decreases. Further, it is also necessary to divide the read electrodes into a plurality of systems capable of being controlled independently. Accordingly, there is a problem in that a production cost of the imaging devices increases.

SUMMARY OF THE INVENTION

An object of the present invention is to provide an image processing device capable of decreasing color phase shift due to deterioration of transfer efficiency of an imaging device with simple processing, and an image processing method therefor.

In order to achieve the above objects, according to the present invention, there is provided an image processing device in which an imaging device includes pixels arranged in horizontal and vertical directions, and color filters of red (R), green (G), and Blue (B) colors each allocated to the pixels, the image processing device converting an image signal outputted from the imaging device into image data of a digital signal and then subjecting each of the pixels to color correction processing based on the image data. The image processing device is characterized by including: a color interpolation device for interpolating colors by calculating horizontal and vertical components of the R, G, and B colors of each of the pixels based on pixel data of each of the pixels and their peripheral pixels; and a linear matrix circuit for subjecting each of the pixels to the color correction processing after performing a linear matrix operation based on the horizontal and vertical components of the R, G, and B colors, and different color correction coefficients set for each of the horizontal and vertical components.

It is preferable that the imaging device transfers signal charge generated by each of the pixels in the vertical and horizontal directions to output the image signal, and the color correction coefficients are set based on transfer efficiency of the imaging device.

The color interpolation device preferably calculates the horizontal component of the pixel having a color different from a target pixel to be subjected to the color correction processing based on the pixels on the same row as the target pixel during the horizontal transfer, and calculates the vertical component of the pixel having a color different from the target pixel based on the pixels not on the same row as the target pixel during the horizontal transfer.

It is preferable that weights are added to the color correction coefficients such that the color correction coefficient for the horizontal component is larger than the color correction coefficient for the vertical component.

According to the present invention, there is provided an image processing method in which an imaging device includes pixels arranged in horizontal and vertical directions, and color filters of red (R), green (G), and Blue (B) colors each allocated to the pixels, the image processing device converting an image signal outputted from the imaging device into image data of a digital signal and then subjecting each of the pixels to color correction processing based on the image data. The image processing method is characterized by including the steps of: interpolating colors by calculating horizontal and vertical components of the R, G, and B colors of each of the pixels based on pixel data of each of the pixels and their peripheral pixels; and subjecting each of the pixels to the color correction processing after performing a linear matrix operation based on the horizontal and vertical components of the R, G, and B colors, and different color correction coefficients set for each of the horizontal and vertical components.

It is preferable that the image signal is outputted from the imaging device by transferring signal charge generated by each of the pixels in the vertical and horizontal directions and the color correction coefficients are set based on transfer efficiency of the imaging device.

The color interpolation device preferably calculates the horizontal component of the pixel having a color different from a target pixel to be subjected to the color correction processing based on the pixels on the same row as the target pixel during the horizontal transfer, and calculates the vertical component of the pixel having a color different from the target pixel based on the pixels not on the same row as the target pixel during the horizontal transfer.

It is preferable that weights are added to the color correction coefficients such that the color correction coefficient for the horizontal component is larger than the color correction coefficient for the vertical component.

According to the present invention, there is provided a digital camera characterized by including: an imaging device including pixels arranged in horizontal and vertical directions, and color filters of red (R), green (G), and Blue (B) colors each allocated to each of the pixels; an image processing device for converting an image signal outputted from the imaging device into image data of a digital signal and for subjecting each of the pixels to color correction processing based on the image data; a color interpolation device provided in the image processing device, for interpolating colors by calculating horizontal and vertical components of the R, G, and B colors of each of the pixels based on pixel data of each of the pixels and their peripheral pixels; and a linear matrix circuit provided in the image processing device, and subjecting each of the pixels to color correction processing after performing a linear matrix operation based on the horizontal and vertical components the R, G, and B colors, and different color correction coefficients set for each of the horizontal and vertical components.

It is preferable that the imaging device transfers signal charge generated by each of the pixels in the vertical and horizontal directions to output the image signal and the color correction coefficients are set based on transfer efficiency of the imaging device.

The color interpolation device preferably calculates the horizontal component of the pixel having a color different from a target pixel to be subjected to the color correction processing based on the pixels on the same row as the target pixel during the horizontal transfer, and calculates the vertical component of the pixel having a color different from the target pixel based on the pixels not on the same row as the target pixel during the horizontal transfer.

It is preferable that weights are added to the color correction coefficients such that the color correction coefficient for the horizontal component is larger than the color correction coefficient for the vertical component.

The digital camera preferably further includes a storage device for storing the color correction coefficients and the transfer efficiency.

According to the present invention, the horizontal and vertical components of R, G, and B colors of each of the pixels are calculated based on the pixel data of each of the pixels and their peripheral pixels, and the colors are interpolated. Then, each of the pixels is subjected to color correction processing by performing linear matrix operation based on the horizontal and vertical components of the R, G, and B colors, and different color correction coefficients set for each of the horizontal and vertical components. Therefore, it is possible to prevent occurrence of color phase shift due to leakage of signal charges by adding weights to the color correction coefficients to such that color correction coefficients in the horizontal direction in which signal charges leak in transferring the signal charges is larger than that in the horizontal direction. It is also possible to improve processing speed since the color correction processing is performed readily.

Further, the color correction coefficients are set based on the transfer efficiency of the imaging device. Therefore, it is possible to improve the image quality by color correction processing in accordance with the transfer efficiency.

BRIEF DESCRIPTION OF THE DRAWINGS

One with ordinary skill in the art would easily understand the above-described objects and advantages of the present invention when the following detailed description is read with reference to the drawings attached hereto:

FIGS. 5A and 5B are an explanatory views showing a honeycomb arrangement and a pixel data arrangement;

DESCRIPTION OF THE PREFERRED EMBODIMENTS

Figure 1:
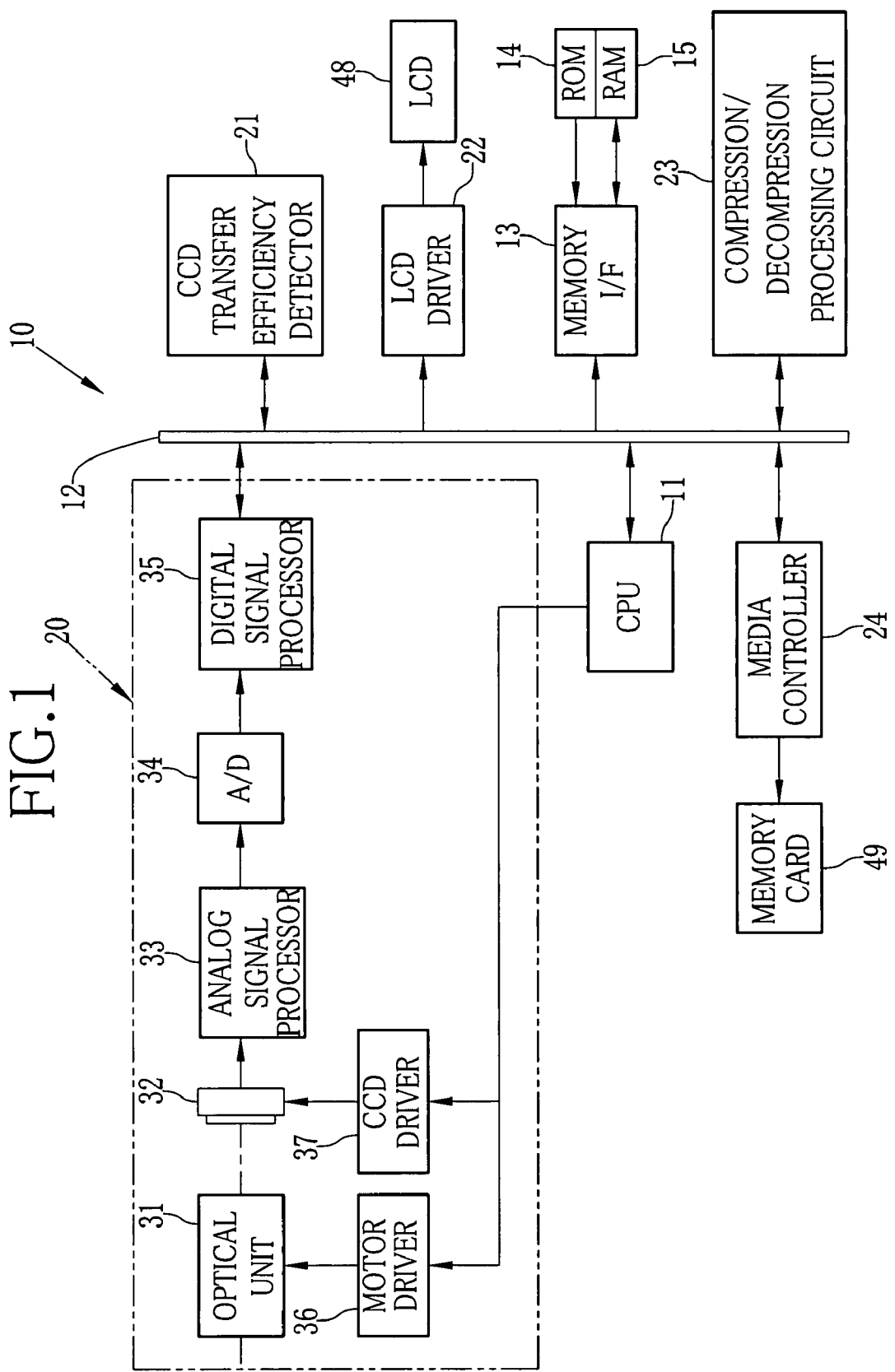
FIG. 1 is a block diagram illustrating an electric configuration of a digital camera.

A digital camera 10 shown in FIG. 1 includes a central processing unit (CPU) 11 for controlling the operation of the camera 10. A read-only memory (ROM) 14 and a random access memory (RAM) 15 are connected to the CPU 11 via a data bus 12 and a memory interface (I/F) 13.

The ROM 14 stores a control program for controlling respective parts of the digital camera 10, various kinds of control data, information regarding transfer efficiency to be described later, and the like at the time of manufacturing the digital camera 10. The RAM 15 temporarily stores work data. The CPU 11 controls the respective parts of the digital camera 10 based on these control program and control data.

Further, in addition to the CPU 11 and the memory I/F 13, an imaging unit 20, a CCD transfer efficiency detector 21, a liquid crystal display (LCD) driver 22, a compression/decompression processing circuit 23, and a media controller 24 are connected to the data bus 12.

The imaging unit 20 is composed of an optical unit 31, a charge-coupled device (CCD) image sensor 32 as a solid state imaging device, an analog signal processor 33, an analog to digital (A/D) converter 34, a digital signal processor 35, a motor driver 36, and a CCD driver 37. The optical unit 31 is composed of a taking lens including a zoom lens, a focus lens, and the like, an aperture stop for regulating light amount, a motor for moving the zoom lens and the focus lens in an optical axis direction, and a motor for changing a diameter of the aperture stop. The motor driver 36 is controlled by the CPU 11 and generates a driving signal for driving the motors in the optical unit 31.

The CCD image sensor 32 is disposed behind the optical unit 31. A plurality of pixels (photodiodes) are two-dimensionally arranged on a light receiving surface of the CCD image sensor 32. Subject light that passes through the taking lens enters the light receiving surface, while its amount is regulated by the aperture stop. An optical image is formed on the light receiving surface by the taking lens. The optical image is converted into an electric image signal and outputted by the CCD image sensor 32. The CCD image sensor 32 is used for capturing a color image. Each of the pixels has a micro color filter whose color is one of red (R), green (G), and blue (B). Signal charge accumulated in each of the pixels is sequentially transferred in vertical and horizontal directions, and thus the image signal is outputted.

Further, the CCD driver 37 is connected to the CCD image sensor 32. The CPU 11 controls the CCD driver 37 such that the CCD driver 37 generates the driving signal for driving the CCD image sensor 32. The image sensor 32 is driven by the driving signals to capture an image of a subject and output the analog image signal.

The analog signal processor 33 is connected to the CCD image sensor 32. The analog signal processor 33 includes a correlated double sampling circuit (CDS) and an AMP. The image signal is inputted to the analog signal processor 33. Noise components in the image signal are removed by the CDS. Then, the image signal is subjected to a gain adjustment in accordance with a preset ISO sensitivity by the AMP.

Thereafter, the image signal is outputted from the analog signal processor 33 to the A/D converter 34. The analog image signal is converted into digital image data (CCDRAW data) and outputted from the A/D converter 34 to the digital signal processor 35. Upon receiving the image data from the A/D converter 34, the digital signal processor 35 subjects the image data to various kinds of signal processing.

Figure 2:
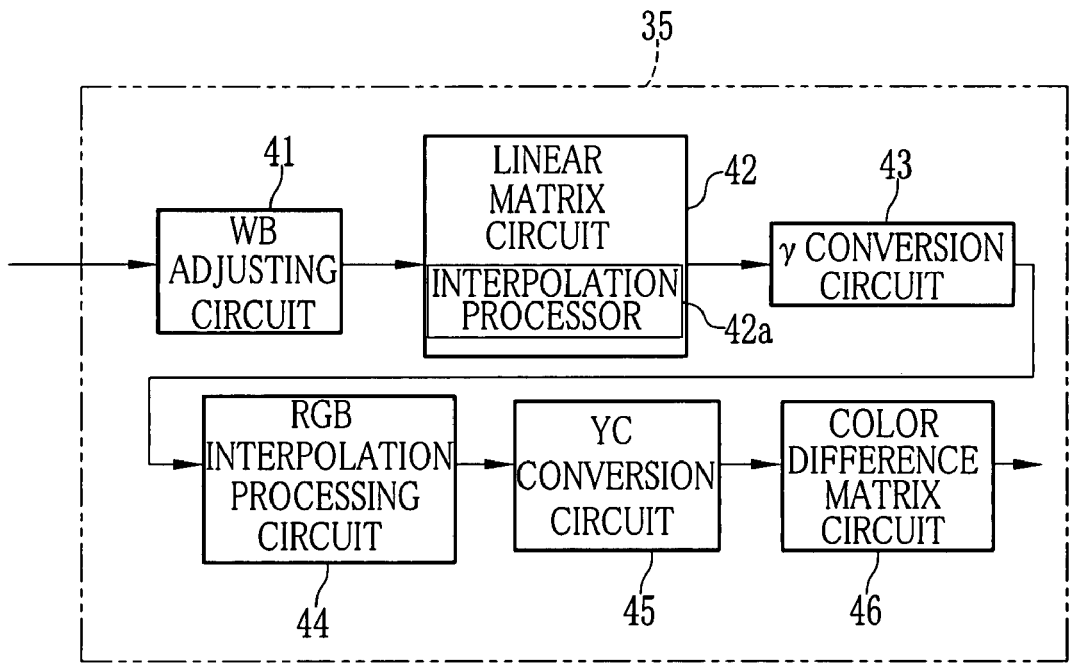
FIG. 2 is a block diagram illustrating a configuration of a digital signal processor.

As shown in FIG. 2, the digital signal processor 35 is composed of a white balance (WB) adjusting circuit 41, a linear matrix circuit 42, a γ conversion circuit 43, an RGB interpolation processing circuit 44, a YC conversion circuit 45, and a color difference matrix circuit 46.

The WB adjusting circuit 41 adjusts the white balance such that a white color of the subject is correctly reproduced by correcting the gain of the red(R), green(G), and blue(B) components of the image data. The image data is subjected to color correction in the WB adjusting circuit 41, and outputted to the linear matrix circuit 42. The linear matrix circuit 42 corrects the color of each pixel data by adding a predetermined amount of pixel data of peripheral pixels thereto in order to improve color reproduction. The linear matrix circuit 42 corrects the color of a captured image in accordance with spectroscopic characteristics of a color filter of the CCD image sensor 32.

Concretely, the linear matrix circuit 42 performs the color correction on a pixel by pixel basis.

The linear matrix circuit 42 includes an interpolation processor 42a as a color interpolation device. The image data inputted to the linear matrix circuit 42 is a set of pixel data each having one color. The interpolation processor 42a performs RGB interpolation processing as preprocessing for a matrix operation. The interpolation processor 42a calculates horizontal components Rh, Gh, Bh, and vertical components Rv, Gv, Bv of the respective R, G, B colors for each pixel based on the pixel data of each pixel and its peripheral pixels.

The linear matrix circuit 42 calculates the pixel data of R' (red), G' (green), and B' (blue) after the interpolation with use of the following formulae 1 to 3, and performs the linear matrix processing, thus correcting the color of each pixel data. Namely, in order to subject the R-pixel to color correction, the interpolation processor 42a calculates, as the preprocessing, the horizontal component Rh and the vertical component Rv based on the pixel data of this target pixel, and also calculates the horizontal components Gh, Bh and the vertical components Gv, Bv based on the pixel data of the pixels G, B located in the periphery of the target pixel. As described later, the horizontal component Rh and the vertical component Rv having the same color as that of target pixel (R) use the pixel data of the target pixel (R). The discrimination between the horizontal and vertical components of other colors (G and B) and the horizontal and vertical components of the target pixel (R) is base on whether the pixel as a base of calculation of the respective components is included together with the pixel of the target pixel (R) in the same line in being transferred in a horizontal direction.

In the following formulae 1 to 3, $r_1$ to $r_6$, $g_1$ to $g_6$, and $b_1$ to $b_6$ are linear matrix coefficients (color correction coefficients), and set based on information regarding transfer efficiency of the CCD image sensor 32 as described later.

$$R' = r_1 \cdot Rh + r_2 \cdot Gh + r_3 \cdot Bh + r_4 \cdot Rv + r_5 \cdot Gv + r_6 \cdot Bv \quad (1)$$

$$G' = g_1 \cdot Rh + g_2 \cdot Gh + g_3 \cdot Bh + g_4 \cdot Rv + g_5 \cdot Gv + g_6 \cdot Bv \quad (2)$$

$$B' = b_1 \cdot Rh + b_2 \cdot Gh + b_3 \cdot Bh + b_4 \cdot Rv + b_5 \cdot Gv + b_6 \cdot Bv \quad (3)$$

As for the color correction coefficients, the coefficients ($r_1$ to $r_3$, $g_1$ to $g_3$, $b_1$ to $b_3$) to the horizontal components Rh, Gh, Bh, and coefficients ($r_4$ to $r_6$, $g_4$ to $g_6$, $b_4$ to $b_6$) to the vertical components Rv, Gv, Bv are discriminated from each other and given different values, so that the horizontal and vertical components can have different weights.

When the transfer efficiency of the CCD image sensor 32 decreases, leakage of charges occurs between adjoining pixels having different colors during the charge transfer. The leakage of charges is perceived as color phase shift, and the leakage of signal charges has more influence in the horizontal direction than in the vertical direction. The linear matrix circuit 42 performs color correction so as to improve the occurrence of color phase shift. Namely, the horizontal components in which influence of the leakage of charges (color phase shift) is large and the vertical components in which influence of the leakage of signal charges (color phase shift) is small are discriminated from each other, and different coefficients are given to the horizontal and vertical components, to reduce the influence of the leakage of charges in the horizontal direction.

The γ conversion circuit 43 receives the image data from the linear matrix circuit 42. The γ conversion circuit 43 subjects the image data to gradation conversion processing in accordance with predetermined γ conversion parameter, and then outputs the image data to the RGB interpolation processing circuit 44. Further, the RGB interpolation processing circuit 44 interpolates color information regarding two missing colors to the pixel data of each pixel, and subjects the image data of each pixel to the RGB interpolation processing to obtain the pixel data of R,G,B colors. Thereafter, the RGB interpolation processing circuit 44 outputs the image data of each pixel after the interpolation processing to the YC conversion circuit 45.

The YC conversion circuit 45 converts the image data represented by R,G,B colors into the image data represented by luminance (Y) and color difference (Cr, Cb), and then outputs the image data represented by Y, Cr, and Cb to the color difference matrix circuit 46. The color difference matrix circuit 46 performs the color correction such that appropriate color reproduction is achieved in a YC system which reproduces the colors using the luminance and the color difference.

Before an image is captured by using the digital camera 10, that is, when a through-image is displayed, an image data with low resolution is inputted to the digital signal processing circuit 35. The digital signal processing circuit 35 subjects the image data with low resolution to the image processing described above. Thereafter, the image data is sequentially read out under the control of the CPU 11 to be displayed as the through-image on a liquid crystal display (LCD) 48 through the LCD driver 22. A user can perform framing of the subject while observing the through-image displayed on the LCD 48.

When the image is captured by operating a shutter button (not shown), main exposure is performed by the CCD image sensor 32, and image data with high resolution is inputted to the digital signal processing circuit 35. The digital signal processing circuit 35 subjects the image data with high resolution to the image processing described above. Then, the image data is compressed, through the compression processing, in a predetermined compression format (for example, JPEG format) by the compression/decompression processing circuit 23. The media controller 24 controls the memory card 49, and records the image data compressed by the compression/decompression processing circuit 23 in the memory card 49.

Further, the CCD transfer efficiency detector 21 detects the transfer efficiency by inputting a pulse into an input gate provided at, for example, the side opposed to an output terminal of a horizontal transfer resistor, and then measuring the extent of attenuation of the input pulse at the output terminal of the horizontal transfer resistor. Note that the detection method of transfer efficiency is not limited to this, and other methods may be adopted. The CCD transfer efficiency detector 21 detects the transfer efficiency at the time of manufacturing the digital camera 10, and the information regarding the transfer efficiency is recorded on the ROM 14.

Note that since the transfer efficiency of the CCD image sensor 32 is detected at the time of manufacturing the digital camera 10, the digital camera 10 may not include the CCD transfer efficiency detector 21. In this case, the transfer efficiency may be detected by a CCD transfer efficiency detector provided outside the digital camera 10, and the information regarding transfer efficiency may be recorded on the ROM 14. Note that, although the ROM 14 records the information regarding transfer efficiency in this embodiment, the ROM 14 may record color correction coefficients set based on the information regarding the transfer efficiency.

Figure 3:
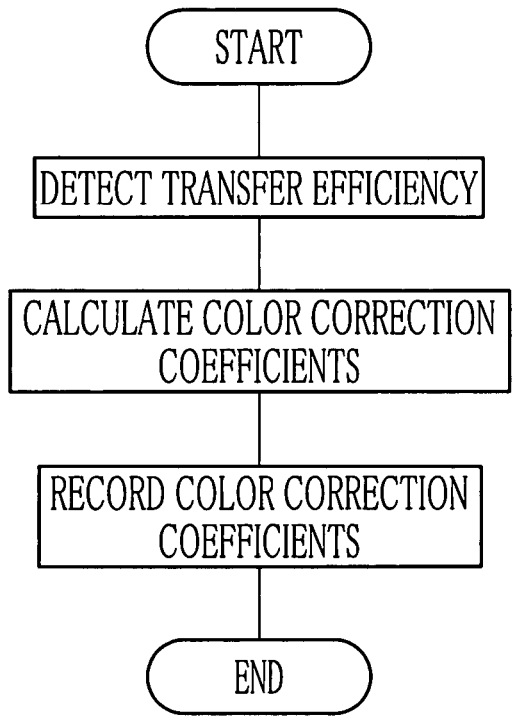
FIG. 3 is a flow chart of a process for recording color correction coefficients.

Hereinafter, recording processing for recording the linear matrix on the ROM 14 is explained with referring to a flowchart in FIG. 3. The transfer efficiency of the CCD sensor 32 is detected by the CCD transfer efficiency detector 21 in adjusting process during manufacturing the digital camera 10.

Thereafter, based on the information regarding the transfer efficiency, the color correction coefficients are set such that the weighting of coefficients in a direction in which signal charge leaks is larger than the weighting of coefficients in a direction in which signal charge does not leak. Namely, the color correction coefficients are set such that the weighting of the coefficients in the horizontal direction ($r_1$ to $r_3$, $g_1$ to $g_3$, and $b_1$ to $b_3$) are larger than the weighting of the coefficients in the vertical direction ($r_4$ to $r_6$, $g_4$ to $g_6$, and $b_4$ to $b_6$). The color correction coefficients correspond to the horizontal and vertical components of the R,G,B colors respectively. Note that the color correction coefficients may be calculated by an operational device provided outside the digital camera 10 or by the CPU 11.

Thereafter, the color correction coefficients $r_1$ to $r_6$, $g_1$ to $g_6$, and $b_1$ to $b_6$ are recorded as parameter on the ROM 14, and thus the recording processing of the color correction coefficients is completed.

Figure 4:
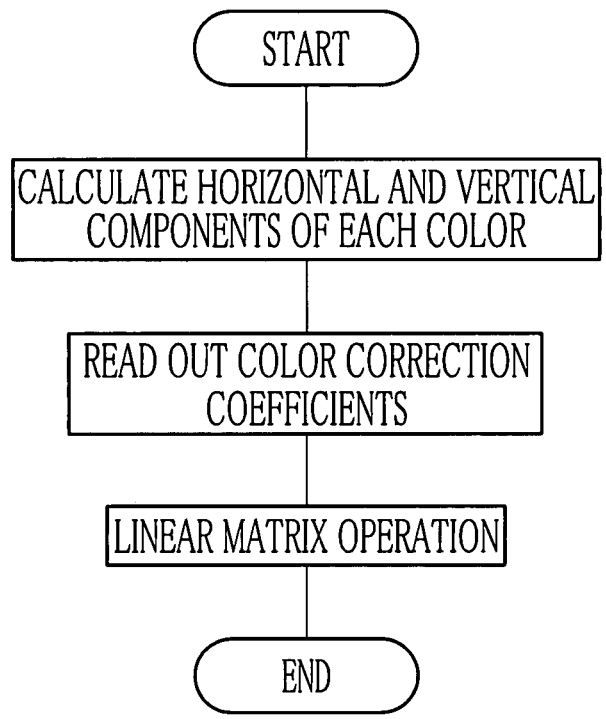
FIG. 4 is a flow chart of linear matrix processing.

Hereinafter, the linear matrix processing in the digital camera 10 is explained by referring to a flowchart in FIG. 4. An image is captured with the CCD image sensor 32, and the image data converted into the digital signal by the A/D converter 34 is inputted to the digital signal processor 35. After the WB adjusting processing, the linear processing is performed. First of all, as the preprocessing for the linear matrix processing, the interpolation processor 42a performs the RGB interpolation. Based on the image data of each pixel and the peripheral pixels, the horizontal components Rh, Gh, Bh, and vertical components Rv, Gv, Bv of each pixel are calculated.

Thereafter, the CPU 11 reads out the color correction coefficients from the ROM 14, and subjects each pixel to the linear matrix operation based on the horizontal components Rh, Gh, Bh, and vertical components Rv, Gv, Bv of the R,G,B colors, thus completing the linear matrix processing. Note that, although the color correction coefficients are recorded on the ROM 14 in the above embodiment, when the information regarding the transfer efficiency is recorded on the ROM 14, the color correction coefficients may be set based on the information regarding the transfer efficiency by the CPU 11.

Hereinafter, the linear matrix operation for each target pixel is explained. Here, a CCD image sensor in which the pixels of R,G,B colors forming an imaging area are in a honeycomb arrangement is used as an the image sensor 32 as shown in FIG. 5A. As is well known, the honeycomb arrangement is obtained by rotating a square lattice arrangement by 45°. In the honeycomb arrangement, a plurality of G-pixels are aligned at a predetermined pitch in horizontal and vertical directions. The R-pixel and the B-pixel are alternately aligned so as to be dislocated from the R-pixel in each row and column at a pitch half of the predetermined pitch described above. Charge in each pixel is transferred to one row at a time in a vertical transfer path provided along each column (in a vertical direction). Thereafter, the charge in each pixel is sequentially transferred in a horizontal direction by use of a horizontal transfer path extending along the lowermost row of the imaging area, and thus read out. Each row of the R-pixels and the B-pixels, and each row of the G-pixels dislocated from the R-B-pixel row by ½ pitch are arranged such that the G-pixel charge is inserted between the R and B pixel charges in the horizontal transfer path. Then, a row of the signal charges of R,G,B colors is transferred in the horizontal direction. Accordingly, leakage of signal charges occur between the adjoining pixels of different colors during the horizontal transfer. FIG. 5B shows an arrangement of each pixel data (signal charges) during the horizontal transfer and after being outputted from the horizontal transfer path.

Figure 6:
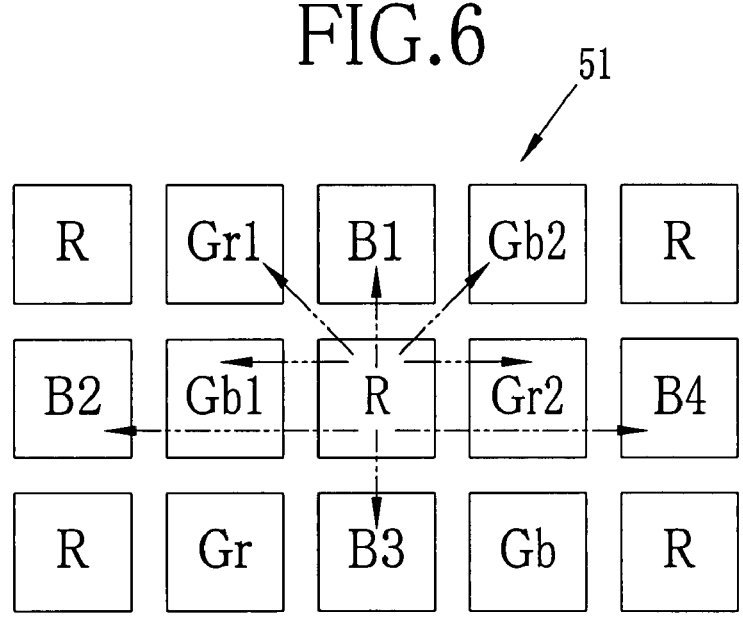
FIG. 6 is an explanatory view showing arrangement of peripheral pixels when a target pixel is R.

The linear matrix circuit 42 sequentially subjects the pixels arranged as shown in FIG. 5B to color correction. First of all, a case in which the target pixel is R-pixel is explained. In the case of R-pixel, for example, when the pixel arrangement including the R-pixel in its center position is a pixel arrangement 51 in FIG. 6, the horizontal and vertical components of the R,G,B colors are calculated by the following formulae 4 to 8 based on the pixel data of the R-pixel as the target pixel and the pixel data of G-pixel (Gr1, Gb1, Gr2, Gb2) and B-pixel (B1 to B4) in the periphery of the R-pixel.

$$Rh=Rv=R \quad (4)$$

$$Gh=(Gr2+Gb1)/2 \quad (5)$$

$$Gv=(Gr1+Gb2)/2 \quad (6)$$

$$Bh=(B2+B4)/2 \quad (7)$$

$$Bv=(B1+B3)/2 \quad (8)$$

Numeric suffixes (1, 2) are appended to the G-pixels and B-pixels in the periphery of the R-pixel (target pixel) for the purpose of discriminating pixels for use in the color correction and pixels not for use in the color correction. Alphabetical suffixes (r, b) are appended to the G-pixels for the purpose of indicating whether the adjoining pixel on the upstream side of the G-pixel in the horizontal direction is R-pixel (r) or B-Pixel (b).

Since the R-pixel is the target pixel, the pixel data thereof is directly used as the horizontal component Rh and the vertical component Rv. In the case of the B-pixel, since B2 and B4 are on the same row as the R-pixel, it is necessary to take the leakage of charges into consideration. Therefore, the B2 and B4 are used as pixels functioning as a base for calculating the horizontal component Bh. On the contrary, since the B1 and B3 are not on the same row as the R-pixel, the B1 and B3 are used as pixels functioning as a base for calculating the vertical component Bv. In this case, it is not necessary to take the leakage of charges into consideration. In the case of G-pixel, since the Gb1 and Gr2 are on the same row as the R-pixel, it is necessary to take the leakage of charges into consideration. Therefore, the Gb1 and Gr2 are used as pixels functioning as a base for calculating the horizontal component Gh. On the contrary, since the Gr1 and Gb2 are not on the same row as the R-pixel, the Gr1 and Gb2 are used as pixels functioning as a base for calculating the vertical component Gv. In this case, it is not necessary to take the leakage of charges into consideration.

Further, the color correction coefficients are set such that conditions of $r_1=r_4$, $r_2>r_5$, and $r_3>r_6$ are satisfied. Then, based on the horizontal and vertical components of the respective R,G,B colors, and the color correction coefficients $r_1$ to $r_6$, R' is calculated by the formula 1.

Figure 7:
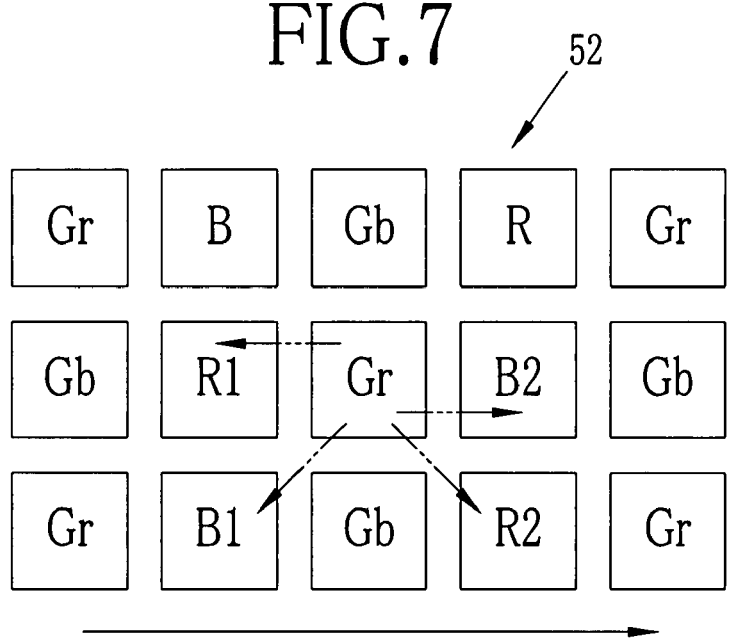
FIG. 7 is an explanatory view showing arrangement of peripheral pixels when a target pixel is Gr.
Figure 8:
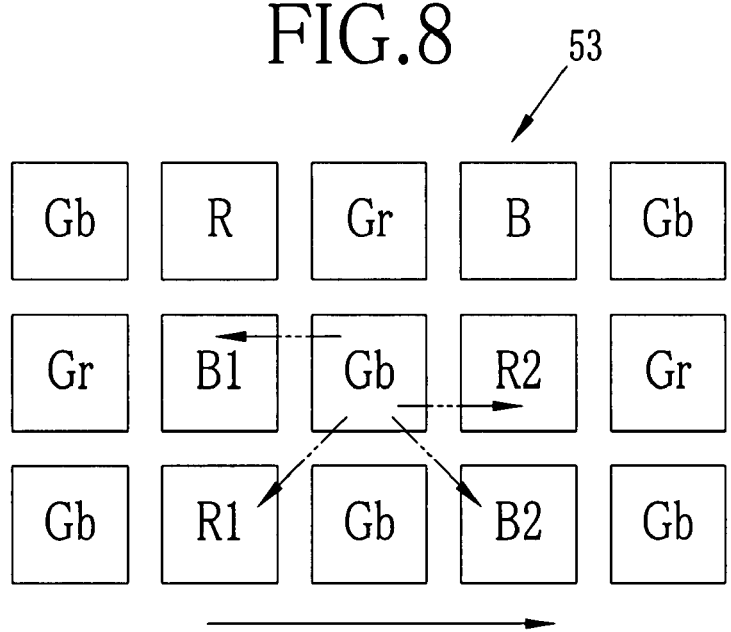
FIG. 8 is an explanatory view showing arrangement of peripheral pixels when a target pixel is Gb.

Next, when the target pixel is G(Gr), in a pixel arrangement 52 shown in FIG. 7 as an example of a pixel arrangement including the target pixel G(Gr) in its center position, under the condition that Rh=R1, Rv=R2, Gh=Gv=Gr, Bh=B2, and Bv=B1 are satisfied, the horizontal and vertical components of the respective R,G,B colors are calculated. Additionally, when the target pixel is G(Gb), in a pixel arrangement 53 shown in FIG. 8 as an example of a pixel arrangement including the target pixel G(Gb) in its center position, for example, under the condition that Rh=R2, Rv=R1, Gh=Gv=Gb, Bh=B1, and Bv=B2 are satisfied, the horizontal and vertical components of the respective R,G,B colors are calculated.

When the target pixel is G, as in the case of R, the pixel as a base for calculating the horizontal and vertical components is discriminated based on whether the pixel is on the same row as the target pixel or not.

When the target pixel is either Gr or Gb, the color correction coefficients are set such that conditions of $g_1>g_4$, $g_2=g_5$, and $g_3>g_6$ are satisfied. Then, based on the horizontal and vertical components of the respective R,G,B colors, and the color correction coefficients $g_1$ to $g_6$, G' is calculated by the formula 2.

Figure 9:
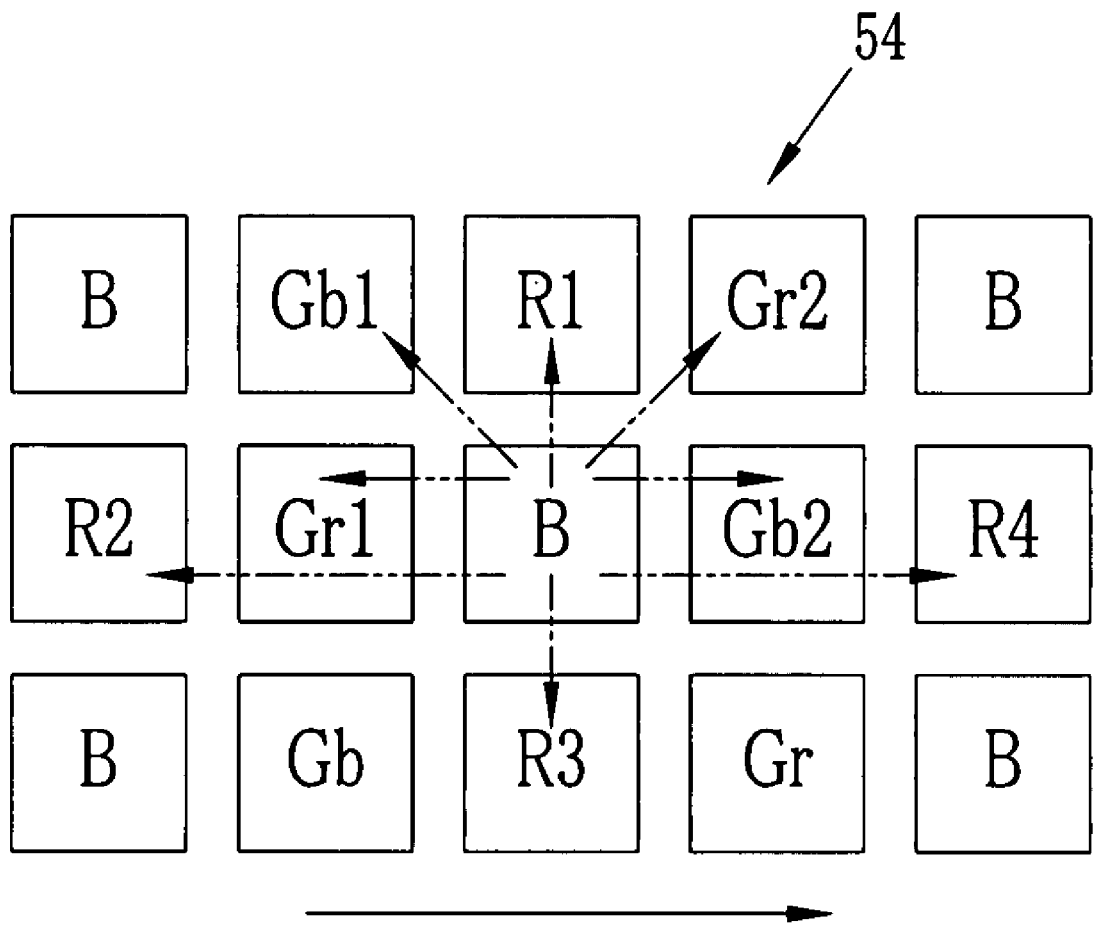
FIG. 9 is an explanatory view showing arrangement of peripheral pixels when a target pixel is B.

Similarly, when the target pixel is B, in a pixel arrangement 54 shown in FIG. 9 as an example of a pixel arrangement including the target pixel B in its center position, the horizontal and vertical components of the respective R, G, B colors are calculated by the following formulae 9 to 13.

$$Rh=(R2+R4)/2 \qquad (9)$$

$$Rv=(R1+R3)/2 \qquad (10)$$

$$Gh=(Gr1+Gb2)/2 \qquad (11)$$

$$Gv=(Gr2+Gb1)/2 \qquad (12)$$

$$Bh=Bv=B \qquad (13)$$

Further, the color correction coefficients are set such that conditions of $b_1>b_4$, $b_2>b_5$, and $b_3=b_6$ are satisfied. Then, based on the horizontal and vertical components of the respective R,G,B colors, and the color correction coefficients $b_1$ to $b_6$, B' is calculated by the formula 3.

Although the CCD image sensor with the honeycomb pixel arrangement is used as an example in the above embodiment, the present invention is applicable to the CCD image censor with the square lattice pixel arrangement.

Note that, in the above embodiment, although the present invention is applied to the digital camera, the present invention is not limited thereto. The present invention may be applied to a digital video camera, for example.

The present invention is not to be limited to the above embodiments, and on the contrary, various modifications will be possible without departing from the scope and spirit of the present invention as specified in claims appended hereto.

What is claimed is:

1. An image processing device in which an imaging device includes pixels arranged in horizontal and vertical directions, and color filters of red (R), green (G), and Blue (B) colors each allocated to said pixels, said image processing device converting an image signal outputted from said imaging device into image data of a digital signal and then subjecting each of said pixels to color correction processing based on said image data, said image processing device comprising:
    a color interpolation device for interpolating colors by calculating horizontal and vertical components of said R, G, and B colors of each of said pixels based on pixel data of each of said pixels and their peripheral pixels; and
    a linear matrix circuit for subjecting each of said pixels to said color correction processing after performing a linear matrix operation based on said horizontal and vertical components of said R, G, and B colors, and different color correction coefficients set for each of said horizontal and vertical components,
    wherein said imaging device transfers signal charge generated by each of said pixels in said vertical and horizontal directions to output said image signal, and said color correction coefficients are set based on transfer efficiency of said imaging device.

2. An image processing device as defined in claim 1, wherein said color interpolation device calculates said horizontal component of the pixel having a color different from a target pixel to be subjected to said color correction processing based on the pixels on the same row as said target pixel during said horizontal transfer, and calculates said vertical component of the pixel having a color different from said target pixel based on the pixels not on the same row as said target pixel during said horizontal transfer.

3. An image processing device as defined in claim 2, wherein weights are added to said color correction coefficients such that said color correction coefficient for said horizontal component is larger than said color correction coefficient for said vertical component.

4. An image processing method in which an imaging device includes pixels arranged in horizontal and vertical directions, and color filters of red (R). green (G), and Blue (B) colors each allocated to said pixels, said image processing device converting an image signal outputted from said imaging device into image data of a digital signal and then subjecting each of said pixels to color correction processing based on said image data, said image processing method comprising the steps of:
    interpolating colors by calculating horizontal and vertical components of said R, G, and B colors of each of said pixels based on pixel data of each of said pixels and their peripheral pixels; and
    subjecting each of said pixels to said color correction processing after performing a linear matrix operation based on said horizontal and vertical components of said R, G, and B colors, and different color correction coefficients set for each of said horizontal and vertical components,
    wherein said image signal is outputted from said imaging device by transferring signal charge generated by each of said pixels in said vertical and horizontal directions, and said color correction coefficients are set based on transfer efficiency of said imaging device.

5. An image processing method as defined in claim 4, wherein said horizontal component of the pixel having a color different from a target pixel to be subjected to said color correction processing is calculated based on the pixels on the same row as said target pixel during said horizontal transfer, and said vertical component of the pixel having a color different from said target pixel is calculated based on the pixels not on the same row as said target pixel during horizontal transfer.

6. An image processing method as defined in claim 5, wherein weights are added to said color correction coefficients such that said color correction coefficient for said horizontal component is larger than said color correction coefficient for said vertical component.

7. A digital camera comprising:
   an imaging device including pixels arranged in horizontal and vertical directions, and color filters of red (R), green (G), and Blue (B) colors each allocated to said pixels,
   an image processing device for converting an image signal outputted from said imaging device into image data of a digital signal and for subjecting each of said pixels to color correction processing based on said image data;
   a color interpolation device provided in said image processing device, for interpolating colors by calculating horizontal and vertical components of said R, G, and B colors of each of said pixels based on pixel data of each of said pixels and their peripheral pixels; and
   a linear matrix circuit provided in said image processing device, for subjecting each of said pixels to said color correction processing after performing a linear matrix operation based on said horizontal and vertical components of said the R, G, and B colors, and different color correction coefficients set for each of said horizontal and vertical components,
   wherein said imaging device transfers signal charge generated by each of said pixels in said vertical and horizontal directions to output said image signal, and said color correction coefficients are set based on transfer efficiency of said imaging device.

8. An digital camera as defined in claim 7, wherein said color interpolation device calculates said horizontal component of the pixel having a color different from a target pixel to be subjected to said color correction processing based on the pixels on the same row as said target pixel during said horizontal transfer, and calculates said vertical component of the pixel having a color different from said target pixel based on the pixels not on the same row as said target pixel during said horizontal transfer.

9. An digital camera as defined in claim 8, wherein weights added to said color correction coefficients such that said color correction coefficient for said horizontal component is larger than said color correction coefficient for said vertical component.

10. An digital camera as defined in claim 7, further comprising a storage device for storing said color correction coefficients and said transfer efficiency.

* * * * *